United States Patent [19]

Schuck

[11] 4,235,419
[45] Nov. 25, 1980

[54] STORING DEVICE FOR A CABLE FIXED ON EITHER OF ITS ENDS

[76] Inventor: Wilfried Schuck, Berliner Strasse 286, D-605 Offenbach am Main, Fed. Rep. of Germany

[21] Appl. No.: 841,770

[22] Filed: Oct. 13, 1977

[30] Foreign Application Priority Data

Oct. 14, 1976 [DE] Fed. Rep. of Germany ....... 2646283
May 13, 1977 [DE] Fed. Rep. of Germany ....... 2721679
Oct. 8, 1977 [DE] Fed. Rep. of Germany ....... 2745366

[51] Int. Cl.³ .................. B66D 1/00; B66D 1/76; B65H 75/02
[52] U.S. Cl. .................. 191/12 R; 64/30 C; 185/13; 185/43; 179/95; 226/121; 226/182; 226/186; 226/188; 242/107.2; 24/71.2
[58] Field of Search .................. 254/175.5, 135 R; 191/12 R, 12.2 R; 226/121, 143, 49-51, 168, 181, 200, 182, 183, 186, 188; 179/155, 154, 95; 174/69; 339/5 RL, 119 C; 248/329, 330.1; 242/107.2; 64/30 C, 30 E; 185/43, 13

[56] References Cited

U.S. PATENT DOCUMENTS

| 1,865,069 | 6/1932 | Allen | 254/135 R |
| 2,340,440 | 2/1944 | Swann | 191/12 R |
| 2,591,214 | 4/1952 | Tamarin | 242/107.2 X |
| 3,078,074 | 2/1963 | Benedict | 226/183 X |
| 3,156,430 | 11/1964 | Zivi | 242/107.2 X |
| 3,324,560 | 6/1967 | Snyder | 242/107.2 X |
| 3,447,730 | 6/1969 | Jeannette | 226/182 X |

FOREIGN PATENT DOCUMENTS

| 8610 | of 1927 | Australia | 185/43 |
| 246865 | 5/1926 | United Kingdom | 185/43 |

Primary Examiner—Bruce H. Stoner, Jr.
Attorney, Agent, or Firm—Jordan and Hamburg

[57] ABSTRACT

A cable storage device having an operating pulley which is driven by a spring for retraction of cable which is payed out from the device is provided with a friction clutch interconnecting the spring and the pulley so that the clutch slips when the spring has been fully tensioned by paying out of the cable thereby to permit further paying out of cable without further tensioning of the spring.

30 Claims, 7 Drawing Figures

STORING DEVICE FOR A CABLE FIXED ON EITHER OF ITS ENDS

BACKGROUND OF THE INVENTION

The invention relates to a cable winding device for a cable fixed at both ends, in particular a telephone cable, with a storage space for the cable which is guided over an operating pulley provided with a circumferential groove with at least one pressure roller in the area of a pay-out opening.

A device of this kind for winding an ordinary electric cable is known from FR-PS No. 1,424,449. In this known device however the operating pulley is driven by a motor provided for this purpose. This usually makes an additional reduction gear necessary. The equipment is therefore of an extremely expensive design, which affects not only the price but also the weight and the amount of space required. In addition handling is not facilitated but rendered more difficult, as the speed at which the cable is paid out or wound in cannot be freely selected but must be adapted to the motor speed. Quite apart from this, such a motor must be supplied with power. In the case of the conventional arrangement this is effected by the power being taken from the cable to be paid out. It can readily be seen from this that the conventional appliance in accordance with FR-PS No. 1,424,449 is quite unsuitable for telephone cables, as no power adequate to drive a motor can be taken from cables of this type. An additional supply lead to be paid out parallel to the actual telephone cable would therefore be necessary, which would involve not inconsiderable extra expense.

In the light of the above it is the task of the present invention to provide a cable winding device of the type hereinbefore referred to, avoiding the disadvantage of conventional equipment, by means of which a cable fixed at both ends, in particular a telephone cable, can be wound without being loosened from the existing connections at its ends, which is forbidden in the case of telephone cables, and which is nevertheless simply constructed and works safely and can therefore be efficiently produced and used.

SUMMARY OF THE INVENTION

The solution to this problem in accordance with the invention is effected in a surprisingly simple manner by the operating pulley operating with a pretensioned spring which in the course of the withdrawal of the cable, can be stopped in the drawn-out condition be means of a stopping device which can be operated with the help of the cable.

These measures provide in a convenient manner an extremely simple and handy arrangement which allows easy and simple operation. The cable is merely drawn out by hand, as a result of which the operating pulley is made to turn and the spring is tightened. The rate of drawing out can therefore be adapted to the special individual circumstances of each particular case.

In the course of the winding-in process the force of the pre-tensioned spring is applied to the cable, which ensures tight guiding of the material and at the same time individual handling. The measure in accordance with the invention therefore provide an extremely simple arrangement, economical of space and weight, and easy to operate. Provision can be made with the aid of the stopping device in accordance with the invention so that in spite of the pre-stressing of the spring, practically any desired cable draw-out length can be set. The pre-stressing of the spring, which results in a permanent force operating in the direction of the drawing-in of the cable, ensures however in addition proper tightening of the cable so that when the drawing-in process is started no entanglement of the cable and therefore no interruption of operations is to be feared. The stopping device covered by the invention should for preference be so designed that it can be operated by means of the cable itself, which further simplifies matters.

As an advantageous feature of the design the cable winding device covered by the invention can be provided with a removable cover, which lays open the entire path of the cable from the side. This advantageously ensures extremely simple final assembly of the device covered by the invention, which can readily be carried out by unskilled operatives, and this further enhances the usefulness of the device covered by the invention. It is possible and advantageous for the cover in question to be constructed in two parts so that the inside of the casing is freely accessible above the storage space for the cable via a removable partial cover. This facilitates maintenance of the drawing-in device.

In one preferred form which the invention may take the spring working in conjunction with the operating pulley may take the form of a scroll spring. Such a scroll spring consists simply of the usual flexible strip of steel, which is a very neat and cheap design. To make it possible to adjust the tension of the scroll spring in relation to the length of cable so far wound on, it may be desirable for the operating pulley to be adjustable in relation to the point of action of the scroll spring.

According to a first form which the invention may take, the scroll spring can be fastened to a pin laterally offset in relation to the axle of the operating pulley. With this design it may be particularly advantageous for the scroll spring to press against a winding roller at the side of the operating pulley, which is connected to the latter via a clutch. This makes it possible to withdraw cable from the storage place if the scroll spring is entirely wound round the winding roller, as the operating pulley can rotate as a result of the clutch provided, whilst the winding roller is stationary.

Another form of the invention, which adds to the value as an invention of the above mentioned arrangement by ensuring an extremely simple, neat and space-saving design of the drive of the operating pulley, may consist of the provision of a chamber inside the operating pulley, concentric to the bore for its bearing, this chamber containing a spiral drive spring which is fixed to an axle, solid with the casing, engaging with the bore of the bearing with its inner radial end and capable of being brought into frictional engagement with the adjacent chamber wall by means of a clutch spring arranged adjacent to its external circumference.

In consequence of the direct friction between the driving spring and the operating pulley an advantageous means is provided, without an actual clutch, for ensuring an effective and reliable drive of the wheel at any time and yet adequate scope is allowed for relative means of movement in the event of the spring being fully tensioned, whilst the wheel is to be turned further in the tension direction for the release of a further length of cable. The spring tension applied is fully maintained, as can readily be seen. The measures covered by the invention advantageously provide an extremely simple and yet robust design with demands on space so low that they can hardly be lessened, with the result that the manufacturing costs can be kept down very much, with low costs for material, manufacture, and assembly; this is a point of particular importance in the case of mass production articles of the type here concerned. At the same time as a result of the fitting of the spring in the operating pulley an extremely compact design can be achieved. Furthermore the concealed spring arrangement resulting from the measures in accordance with the invention provides excellent protection against dust, impact and collision and therefore guarantees the utmost safety in operation and minimum liability to stoppages. The advantages achieved by the invention should therefore be considered principally from the economic point of view.

The clutch spring can take the form of a flat spring wrapped in with the outermost turn of the spiral spring. This can be effected at very slight expense though the strength of the clutch spring can still be adapted to the particular circumstances prevailing. It may be convenient to provide a clamping device arranged at the radially outer end of the spiral spring for securing the flat spring forming the clutch spring. This development advantageously permits the accurate and reliable location of the clutch spring. This clamping device may, in simple fashion, take the form of a tongue on the spiral spring bent over inwards.

A further particularly advantageous form of the invention may consist in the chamber wall adjacent to the outer winding of the spiral spring being finished with a frictional surface. This gives a particularly high degree of reliability to the drive and ensures precise and troublefree operation. This can be very easily carried out by the chamber wall being roughened. A convenient way of effecting this is by giving the chamber wall a sand-blasted surface.

As a further development of the above features the spiral spring may, in order to connect it to the axle in one piece with the casing, be provided with a nose formed on its radially inward end which engages positively with a corresponding notch in the axle. This development advantageously provides a simple and handy snap-lock. The nose formed on the radially inward end of the spiral spring can for preference simply take the form of a tongue bent over inwards. It may be of particular benefit from the production point of view if the axle is provided with a collar in which the notch appears. It may be desirable for the collar to be arranged on the axle so that it can be detached but is secured against rotation, and/or provided with a heart-shaped slot forming the notch in which the nose provided can enter automatically, which not inconsiderably simplifies assembly.

In a highly preferred form a back rotation stop for the operating pulley can be provided. With the aid of this it is possible appropriately to prestress the spring when assembling the arrangement, and to lock the wheel by means of the stop whilst the spring is suitably prestressed, in order for instance to insert the cable and fit the cover. The above mentioned development of the principal ideas therefore ensures a particularly simple and obvious final assembly of the arrangement covered by the invention.

A particularly simple design of the above mentioned back rotation stop may consist of the operating pulley being provided with a toothed wheel which can be made to engage with a ratchet device supported firmly in the casing. For preference this ratchet device can be locked in the engaged position and also in the non-engaged position. This ensures that it is impossible either for the ratchet either to be released unintentionally in the engaged position or caught unintentionally in the disengaged position. A design which involves very little expenditure could consist of the ratchet device being locked by means of knobs firmly fixed in the casing. It may be advisable for the ratchet device to be provided in addition with an operating notch, which would particularly facilitate handling and operation by means of a screwdriver etc.

Another particularly advantageous design may consist in the ratchet device being made from elastic material. By this means the elasticity of the device itself would provide the desired ratchet effect, so that a pivoted bearing etc. can be dispensed with.

A further, not very obvious, development of the main ideas is for the operating pulley to be divided in the radial direction in the area of the circumferential groove into two halves, held together by spring pressure. This has the advantage of automatically adapting the space of the circumferential groove to the thickness of the cable in use, which would make possible a highly desirable standardisation of manufacture. This also ensures that the cable is in close contact with the appropriate surfaces of the circumferential groove of the operating pulley both in the condition under load—i.e. during the withdrawal process—and also in the unloaded position—during the winding process. In many cases it may be desirable for the operating pulley to be provided with a pressure roller forcing the cable into the circumferential groove. To protect the cable against excessive centrifugal forces, guiding rollers can be provided on the circumference of the operating pulley in fixed positions on the casing.

Another particularly desirable measure may be for the surface of the operating pulley on which the cable runs to be roughened—preferably fluted. This ensures clean and precise movement of the cable even with a small arc of contact.

To effect precise fixing of the complete device in relation to the cable this may be fixed in the area of the inlet opening in the casing. To protect the length of cable at the pay-out end against unintentionally being drawn in, this can be locked by means of a locking device, which is provided with a chamfer in the area of the pay-out opening arranged at a distance from a cable guiding surface, this chamfer being provided with a toothed surface on which a toothed clamping wheel rests. This clamping wheel, in the event of the cable being unintentionally drawn in, is pulled along the chamfer in question until the cable is locked.

Since the cable is always under tension independently of the cable length in the storage space, it is also preferable for a stop to be provided on the cable in front of one of the openings in the casing. This stop acts as an additional safety measure besides a draw-in lock for the cable which should also for preference be provided in the casing. The stop is preferably so designed it can be fixed to the cable at any desired point along its length.

To ensure that when winding in the cable, i.e. when taking the cable to the storage space, the cable is there so laid that it can afterwards be guided back to the groove in the pulley without difficulty, an important embodiment of the main invention provides that between the entry side of the operating pulley and the storage space a guide in two parts expanding in tapered form towards the storage space. This guide, the opening of which the storage space is regularly increased in bell-shape, has the effect of making sure that the cable will be laid in more or less circular form. The guide is in two parts to make possible the introduction of a cable fixed at both ends into the guide.

It may often be advantageous in achieving a good circular lay of the cable in the storage space, for the bottom of the storage space to be inclined to the horizontal. This has the effect of allowing the cable, which has been laid in circular coils, to slide to one side and down to the bottom of the lower position of the bottom of the storage area. However it is often satisfactory for the bottom of the storage space to be horizontal. In this way space in design is saved without loss of storage space.

Further features of the advantages of the invention may be seen from the following description of a few preferred examples of forms which the invention may take, with the help of the drawing in conjunction with the claims.

DETAILED DESCRIPTION OF A PREFERRED EMBODIMENT

Figure 1:
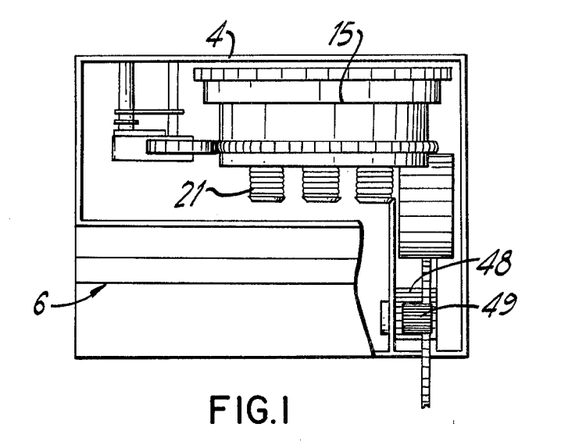
FIG. 1 is a plan view of a first, particularly preferred, design embodying the invention, with a spiral spring arranged in an operating pulley chamber.
Figure 2:
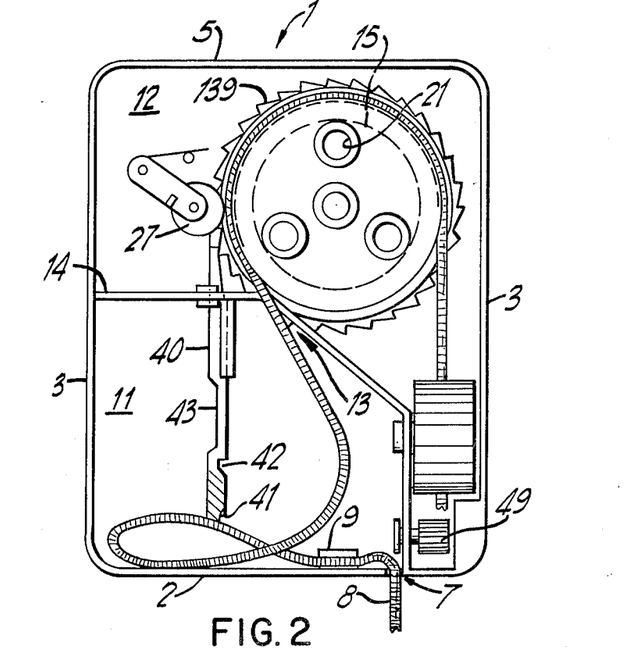
FIG. 2 is front view of the arrangement in accordance with FIG. 1.
Figure 3:
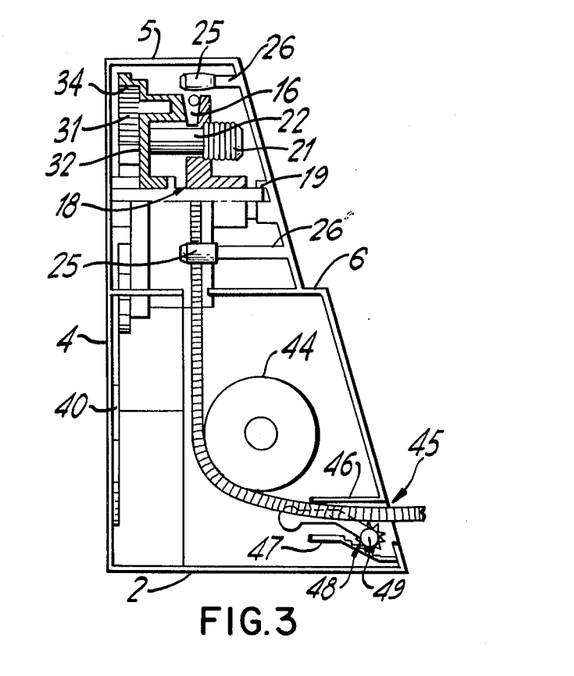
FIG. 3 is a side view of the arrangement in accordance with FIG. 1 with the cover partly in cross-section.

The cable winding device shown in details in FIGS. 1–3 is provided with a suitable casing having a bottom 2—preferably in this case running horizontally—side walls 3, a rear wall 4, an upper cover 5 and a removable cover 6. The horizontal arrangement of the bottom or floor ensures good utilisation of the space available. In many cases however it may be found desirable for the surface of the bottom to be arranged somewhat at an angle to the horizontal, to form a slide for the cable, as can be seen for example in FIG. 6. The casing 1 may conveniently be designed as a two-part injection moulding with at least one, the rear wall 4 or the cover 6, cast at the same time, whilst the bottom 2, the side wall 3 and the top cover 5 form edge flanges. In the bottom 2 there is an inlet opening 7 for a cable 8, fixed at both its ends, for example a telephone cable, which is fixed on one side to a connecting box and at the other to a telephone. Close behind the inlet opening 7 the cable 8 is secured by means of a resilient device (shown in FIG. 2 as 9) to the casing 1.

Figure 4:
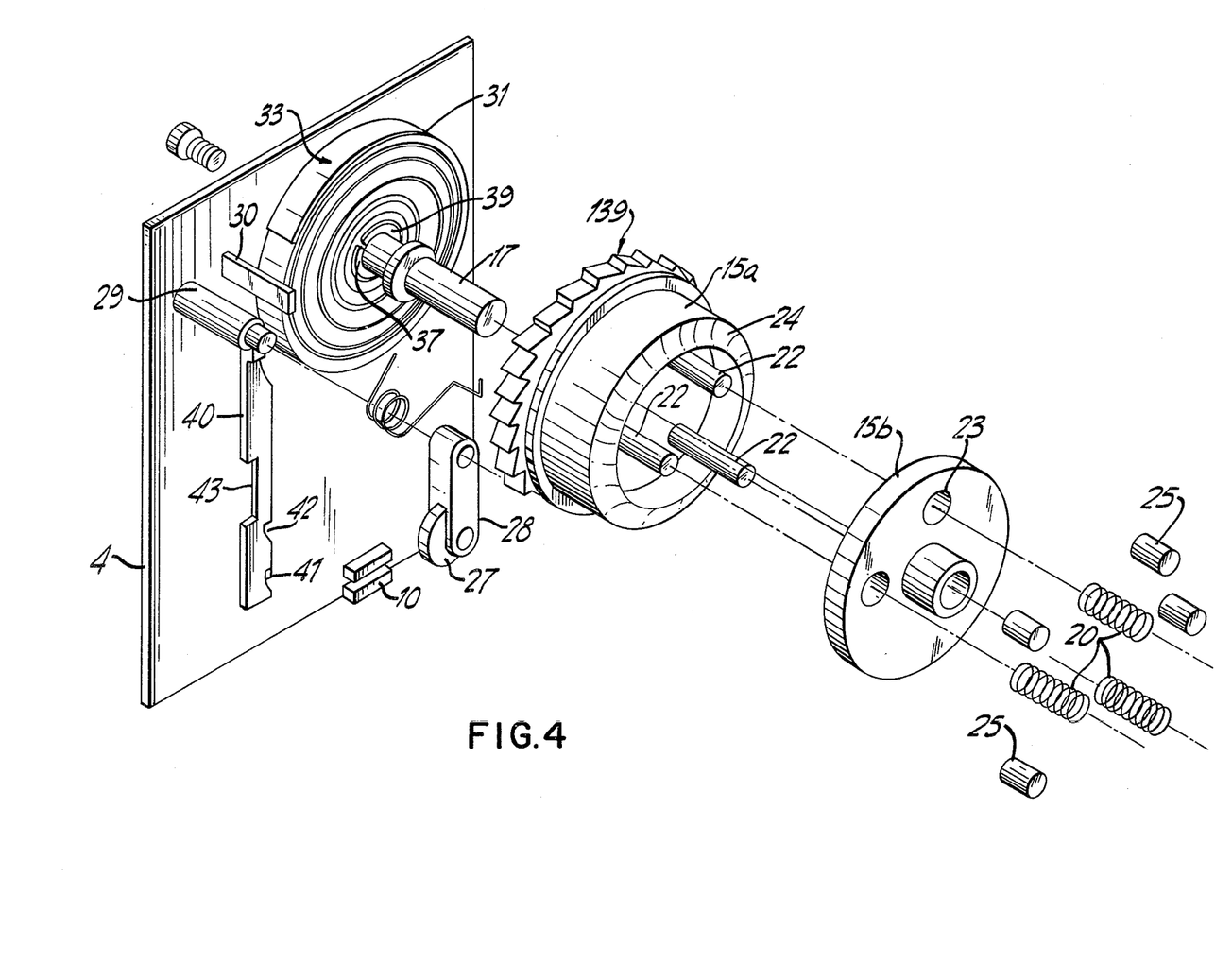
FIG. 4 is a perspective exploded view of the most important parts of the arrangement shown in FIGS. 1 to 3.

The resilient clamping device 9 can, as is best shown by FIG. 4, be formed simply by two clamping strips 10 moulded on to the rear wall 4, between which the cable 8 is simply pushed in. The inlet opening 7 opens out into a storage space 11 for the length of cable drawn in. The cable 8 is in this case conveniently laid in the form of loops. In the particular embodiment of the invention shown, there is so far only one loop of cable in the storage space. The storage space 11 is partitioned off from a further space 12, which contains the drawing or winding device described in greater detail below by means of a partition wall 14 which on the cover side has an opening 13. In the example of the invention illustrated the opening 13 simply takes the form of a space in the wall. It may often appear desirable however to provide the opening with a cable guide 13a in two parts in bell-shape, tapering towards the top, as can best be seen on FIG. 6. Such a cable guide facilitates the tendency of the cable to be laid in loops. The partition wall 14 may conveniently also be moulded on also to the rear wall 4 and partly to the cover 6, with the joint passing through the opening 13, so that the cable 8 can be easily inserted with the cover 6 removed.

For the formation of the drawing device already mentioned an operating pulley 15 is fitted supported by bearings in the space 12 above the storage space 11, and provided with a circumferential groove 16 for the cable, which can best be seen in FIG. 3. The operating pulley 15 should be supported by bearings so as to be free to rotate on a fixed axle in the casing. For the formation of this axle, as is best shown by FIG. 4, an axle journal 17 moulded on to the rear wall 4 may be provided, which fits into a bearing bore shown at 18 in FIG. 3 in the operating pulley 15. To support the bearing journal 17 moulded on to the rear wall 4 at the cover end it may be convenient to provide an insertion socket moulded on to the cover 6, shown at 19 in FIG. 3. The operating pulley 15 in the preferred form of the invention shown takes the form, as can best be seen on FIG. 4, of a roller split into two parts shown as 15a and 15b. The joint between these two parts of the roller is at the bottom of the circumferential groove 16 provided for the cable 8. The two parts of the roller 15a and 15b are pressed together by compression springs 20 which can best be seen in FIG. 4. In the example shown, as can be seen from FIGS. 1 and 2, three such compression springs are shown on the circumference of the operating pulley 15. The compression springs 20 are supported in each case at one end by the head 21 of a bolt 22, which is secured in each case to the rear part of the roller on the rear wall side, and on the head side passes through the adjacent part of the roller 15b, which is provided with appropriate openings 23. The other ends of the compression springs 20 are supported by the part of the roller 15b. The holes or openings 23 may conveniently be provided for this purpose with suitable countersunk edges, which are not actually shown in the particular design illustrated. The elasticity of the compression springs 20 gives an excellent guarantee of precise automatic adjustment of the width of the circumferentual groove 16 according to the thickness of the cable and its radial position.

The cable 8 is wound round the roller 15 for adequate arc of contact. In the example shown, which is given particular preference, the surfaces of the circumferential groove 16 are roughened—preferably as indicated at 24 in FIG. 4,—and fluted, so that a relatively small arc of contact is sufficient. It is desirable however in any case to arrange if possible for multiple coils. Designs of this kind are however particularly suitable for operating pulleys consisting of one piece rollers only. At the circumference of the operating pulley 15 several guide rollers 25 are provided, which may conveniently be supported, as shown particularly in FIG. 3, on journals 26 formed integrally with the cover. The guide rollers 25, the length of which is somewhat greater than the upper width of the circumferential groove 16, prevent the cable 8 from springing out of the circumferential groove 16. In addition the operating pulley 15 is provided with a pressure roller 27 adjacent to the point of cable delivery adjacent the storage space, which has the purpose of pressing the cable into the circumferential groove 16 by the action of a shaped spring, which can be seen particularly well in FIG. 4, but is not described in greater detail. In FIG. 4 the pressure roller 27 is shown swiveled downwards for greater clarity. The pressure roller 27 is supported on a swivel arm 28 which is carried in its turn to pivot on a bolt 29 moulded in one piece with the rear wall. To limit the stroke of the swivel arm 28, a stop 30 solid with the rear wall may be provided, as shown by FIG. 4. The pressure roller 27 ensures positive drive of the cable by means of the preferably fluted surfaces of the circumferential groove 16.

Figure 5:
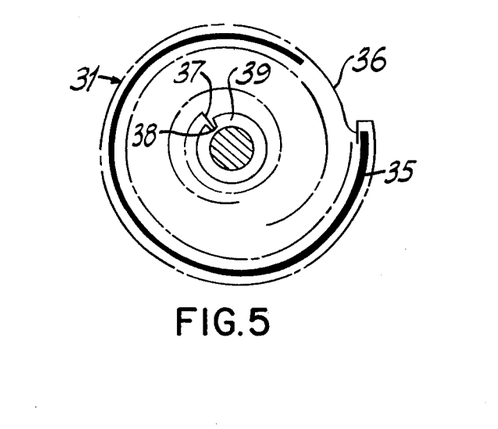
FIG. 5 is a particularly preferred arrangement of the spring, in schematic representation.

For driving the operating pulley 15 a spirally wound driving spring which can easily be recognized at 31 in FIG. 4 is provided and this is fitted inside the operating pulley 15. The latter is provided for this purpose, as is shown in FIG. 3, with a chamber 32 on the rear wall side arranged concentrically to the bearing bore 18. In this chamber the spring 31 is housed free from dust, impact and collision. The radially outer end of the driving spring 31, shown at 33 in FIG. 4, works together with the adjacent chamber wall 34 by means of friction. This frictional force ensures that the wheel 15 is driven by the tensioned driving spring 31 in the direction of winding in of the cable, and in addition that when the cable is drawn out over the pulley 15, the spring is automatically wound up. At the same time it guarantees that the pulley 15, after the full tension of the spring has been reached, can be turned further for pulling out a further length of cable, without over-tensioning the driving spring 31. This frictional effect between the driving spring 31 and the operating pulley 15 is according to the invention provided by a clutch spring, whcih can take the form of a tongue turned outwards of the spirally wound driving spring 31. In the specimen design shown, which is particularly preferred, the clutch spring, as illustrated at 35 in FIG. 5, takes the advantageous form of a flat spring wrapped in with the outer turn of the spiral driving spring 31. The turns of the driving spring 31 are shown in the illustration for the sake of clarity as dotted lines. The flat spring forming the clutch spring 35 is shown as a solid line. To secure the flat spring wound in the outer turn of the driving spring 31, and forming the clutch spring 35a gripping device consisting of a tongue 36 of the driving spring 31 and bent over inwards, is provided in the design example illustrated. The chamber wall 34 which works in conjunction with the driving spring 31 may be conveniently finished as a frictional surface, which can readily be effected by the chamber wall in question being roughened by sand-blasting. It is however also conceivable to design the chamber wall 34 with a clutch lining, or with a suitable moulded ring etc. The radially inward end of the driving spring 31 is secured to the axle journal 17 which supports the operating pulley 15. For this purpose the driving spring 31 can be provided, as is clearly shown in FIGS. 4 and 5, with a "nose" 37 bent round inwards, which engages positively in a suitable notch 38 in the axle journal 17. It may be advisable for the axle journal 17 to be provided with a collar 39 in the area of the seating of the driving spring 31, so that the notch 38 provided for the nose 37 can be produced simply in the form of a slot. It may be advantageous for this slot to have a heart-shaped cross section, which would facilitate easy insertion of the nose 37.

Figure 6:
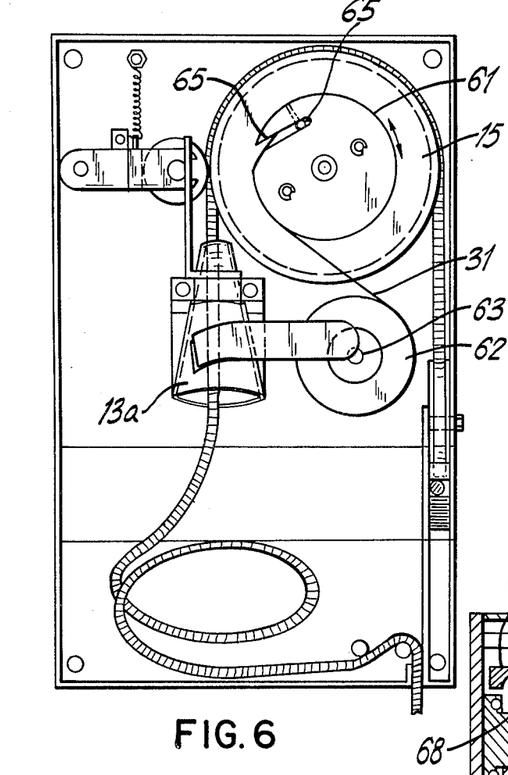
FIG. 6 is a view similar to FIG. 2 of a further form which the invention may take, with a scroll spring arranged adjacent to the operating pulley.
Figure 7:
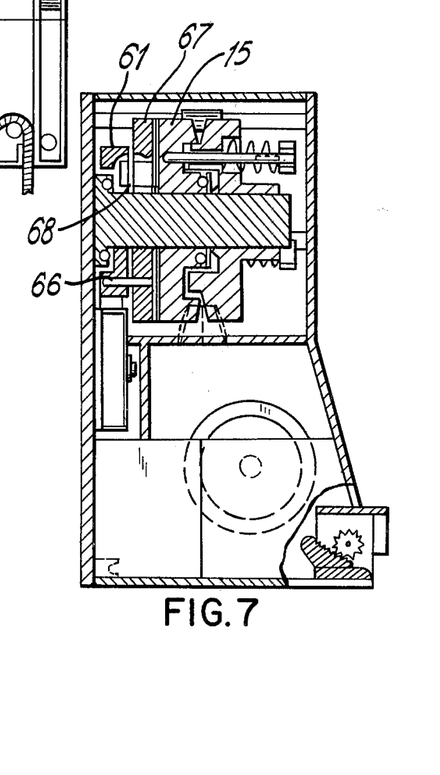
FIG. 7 is a side view corresponding to FIG. 6 incorporating a clutch.

If in individual cases the operating pulley is not to be provided with a chamber to hold the driving spring, an arrangement similar to the specimen designs shown in FIGS. 6 and 7 may be chosen. The construction in principle is similar to the design described above, so that it is convenient to use the same reference numbers for similar parts. In the case of the specimen design illustrated in FIG. 6 the driving spring 31 takes the form of a scroll spring, which is secured to two winding rollers 61 and 62, of which one winding roller 61 is fitted to the operating pulley 15 and the other roller 62 is supported by a pin 63, which is in this case arranged below the operating pulley 15. As soon as any cable is removed, the driving spring 31 made into the form of a scroll spring consisting simply of a steel tape, unwinds itself from the winding roller supported by the pin 63 and on to the winding roller 61 fastened to the operating pulley 15, as a result of which the return energy for drawing in the pulled out length of cable is stored up. When the cable is drawn in, the driving spring 31 made into the form of a scroll spring, unwinds itself from thel winding roller 61 and on to the winding roller 62, whilst driving the operating pulley 15. The driving spring 31 may conveniently be fixed to the winding roller 61 by means of an adjustable pin in a slot 64 of the winding roller 61, as a result of which the spring tension is adjustable. A design of this kind is suitable, as is the design initially described, both for one-piece and two-piece operating pulleys.

It is advisable to provide a clutch between the operating pulley 15 and the winding roller 61 connected thereto. FIG. 7 shows one form which this may take. In this case the winding roller 61 is connected by driving pins 66 with an adjacent clutch disc 67 which is pressed by means of springs 68 supported by the winding roller 61 against the adjacent front side of the operating pulley 15, which in this case is in two parts. The respective surfaces of the clutch disc 67 and the operating pulley 15, which have to work together, should for preference be provided with material which guarantees excellent friction drive under normal working conditions, but at the same time when a relative movement commences opposes a relatively small resistance to this. The fitting of a coupling of this kind guarantees in an excellent manner, just as would a spring fitted in accordance with FIGS. 1–5, deviation of the cable withdrawal length from the spring winding length, and their automatic compensation.

In the course of assembly of devices of the types described above, the driving spring 31 should always be given a certain amount of pre-stressing, in order to ensure a precise return of the operating pulley 15 in the drawing direction to its initial position. The driving spring 31 should reach its full tension after about 30 revolutions in the case of the design shown in FIGS. 1–5. With a design of this kind adequate tension is reached after about 10 revolutions. With a design with a scroll spring in accordance with FIGS. 6 and 7 this may well be reached at an earlier stage. Before the cable 8 is inserted into a device in accordance with the invention, when the latter is put into use, the desired pre-stressing effect is achieved by turning the operating pulley 15 in the pull-out direction. This may for example be effected by turning the operating pulley 15 by hand. In order to prevent the back rotation of the operating pulley 15 at this stage, it is advisable to provide in connection with appliances of the kind described a roller back rotation stop, which brings the operating pulley 15 to a standstill in any desired position against the force of the driving spring 31 which has already been prestressed. In the particularly preferred design illustrated the operating pulley 15 is provided for this purpose with a toothed wheel 139 in the area adjacent to the rear wall which works in conjunction with a ratchet device at the rear wall 4. Such a ratchet device 40 may conveniently consist of elastic material, such as spring steel or a suitable type of plastic etc, so that pivoted suspension is not necessary, but the desired ratchet effect is achieved with the aid of the elasticity of the ratchet device 40 itself. The ratchet device 40 can be stopped in two positions fixed in relation to the casing, viz. a forward position in which it is in engagement with the toothed wheel 139, and a withdrawn position in which the toothed wheel 139 is quite free. For this purpose the rear wall 4 may conveniently be provided with a stopping knob 41, in which the ratchet device 40 can be locked by means of suitable indexing holes in the two positions described above. In the position shown in FIGS. 2 and 4 the ratchet device 40 is for example in the forward position in which it engages the toothed wheel 139. To secure a simple method of operating the ratchet device 40 this may for example be provided with an operating notch similar to that shown at 43. This makes it possible before fitting of the cover 6 simply to push back the ratchet device 40 by means of a screwdriver or the like, for instance. In normal operations the ratchet device 40 is not functioning, as may be seen.

The length of cable running down from the operating pulley 15 is guided by means of a guide roller shown as 44 to the outlet opening 45 and a stopping device is provided for holding the cable at any desired withdrawn length. In the example shown a guide strip 46 running more or less horizontally is provided, beneath which is a chamfer 47 rising from outwards inwards, which is given a toothed profile as shown at 48. On the profiling 48 a clamping wheel 49, provided with a similar profiling, is guided.

If it is desired to hold the cable which is under tension at a certain withdrawn length, the drawn-out length of cable only requires to be passed over the clamping wheel 49 and then this is drawn inwards by the tension to which the cable is subjected along the chamfered portion 47, till the cable is held fast between the clamping wheel 49 and the guide strip 46.

On the length of cable on the outlet side it is possible to clamp on a stop, which is not shown in the present design, which can for instance consist of a piece of tubing in two parts, fitted with a suitable fixing screw. This measure makes it possible to relieve the stopping device described above, which may be particularly desirable if the cable is to remain in a certain withdrawn position for a long period.

The above remarks make very clear the method of operation of the cable winding device covered by the invention. If a certain length of cable must be withdrawn from the casing 1, the user pulls on the cable in front of the outlet opening 45. As a result the operating pulley 15 rotates in the clockwise direction viewed as shown in FIGS. 2-6, as a result of which the driving spring 31 is increasingly stressed or tensioned. When the desired length of cable has been drawn out, the drawn out cable is secured at the outlet opening 45 in the manner described. If a certain length of cable has to be drawn in again, the stop on the outlet opening side should first be released. If a stop has been used on the cable, this is removed. Then the clamping of the cable between the guide strip 46 and the clamping wheel 49 is released by pulling the cable outwards, when the operating pulley 15 put into motion whilst the driving spring 31 loses its tention, and the cable is drawn in. The procedures described above are then repeated with the reverse direction of motion. The length of cable drawn is laid down in the storage space 11 during this drawing in process.

When the cable is drawn out, this runs at a smaller radius on the operating pulley 15, because there is a certain tension on the cable as a result of which, with the assistance of the pessure roller 27, it is forced into the circumferential groove 16. During the drawing-in-process however the cable is running at a somewhat larger radius, as centrifugal force comes into play and the compression springs 20 also assist an outward displacement. Theoretically therefore differences in length may arise between the cable 8 and the driving spring 31 in the operation of the device. In many cases however these are compensated by a certain degree of slip which arises while the cable is being drawn out. Precise compensation can however be achieved as a result of the diverse friction connections between the operating pulley and the spring as described above.

What we claim is:

1. A cable winding device for a cable fixed at both ends, comprising housing means including a storage space for the cable, respective entrance and exit openings for the cable, an operating pulley, at least one pressure roller cooperating with the operating pulley to urge the cable against the operating pulley with sufficient force to assure positive drive of the operating pulley by withdrawal of the cable from the housing, a drive spring cooperating with the operating pulley so as to be increasingly tensioned as the cable is withdrawn from the device, frictional clutch means operatively interconnecting the spring and the operating pulley with such frictional engagement that the clutch means slips when the spring is substantially fully tensioned by withdrawal of the cable from the device thereby maintaining the spring in said substantially fully tensioned state and permitting further withdrawal of the cable while the spring remains in the substantially fully tensioned state, and a locking device adjacent the exit opening for holding a segment of the cable, the locking device comprising a chamber having a toothed surface, a toothed clamping wheel resting freely on the toothed surface and means defining a cable guiding surface spaced sufficiently from the toothed clamping wheel to form with the toothed clamping wheel a restricted passage for the cable.

2. A cable winding device according to claim 1 characterized by a removable cover which leaves the entire cable winding path exposed so as to be accessible from the side.

3. A cable winding device according to claim 2, in which the cover is made in two parts so that the inside of the housing is freely accessible by way of a removable partial cover above the cable storage space.

4. A cable winding device according to claim 1, in which the spring is a scroll spring.

5. A cable winding device according to claim 1, in which the frictional clutch means comprises means forming a rigid wall abutting the periphery of the spring and clutch spring means at an end portion of the spring at the periphery of the spring in such frictional engagement with the rigid wall that the clutch spring means slips relative to said wall when the spring is substantially fully tensioned by withdrawal of the cable from the device thereby maintaining the spring in said substantially fully tensioned state and permitting further withdrawal of the cable while the spring remains in the substantially fully tensioned state.

6. A cable winding device according to claim 5, in which the operating pulley has a bearing bore and an internal chamber concentric to the bore and the device further commprises an axle integral with the housing means, said spring being spirally wound in the chamber with its radially inward end secured to the axle, and said chamber being said means forming a rigid wall.

7. A cable winding device according to claim 6 in which the securing of the radially inward end of the drive spring to the axle is by means of a notch provided in the axle and a nose on said end of the drive spring.

8. A cable winding device in accordance with claim 7, in which the nose on the radially inward end of the drive spring is in the form of a tongue bent over inwards.

9. A cable winding device according to claim 8 in which the axle includes a collar, the notch being formed in the collar.

10. A cable winding device according to claim 9, in which the notch is formed by a heart-shaped slot in the collar.

11. A cable winding device according to claim 9, in which the collar is arranged on the axle so that it is secured against rotation but is removable.

12. A cable winding device according to claim 11 further comprising a toothed wheel integral with the operating pulley, a ratchet device and means on the casing for locking the ratchet device in or out of engagement with the toothed wheel.

13. A cable winding device according to claim 12, in which the means for locking the ratchet device comprises a knob fixed to the housing.

14. A cable winding device according to claim 13, in which the ratchet device has an operating notch.

15. A cable winding device according to claim 14 in which the ratchet device consists of elastic material.

16. A cable winding device according to claim 15, in which the operating pulley has a circumferential groove and is divided in the radial direction adjacent to the circumferential groove into two part rollers and spring means are provided for forcing together the two part rollers.

17. A cable winding device according to claim 16, in which a circumferential groove of the operating pulley on which the cable runs is roughened.

18. A cable winding device according to claim 17, in which the circumferential groove of the operating pulley on which the cable runs is roughened by being fluted.

19. A cable winding device according to claim 5, in which the device spring is a spiral spring and the clutch spring means is a flat spring wound in with the last turn of the spiral spring.

20. A cable winding device according to claim 19, further comprising a clamping device holding the clutch spring means on the radially outer end of the drive spring.

21. A cable winding device according to claim 20, in which the clamping device is a tongue on the end of the drive spring bent over inwards.

22. A cable winding device according to claim 5, in which the wall has a high friction surface.

23. A cable winding device according to claim 22 in which the high friction surface is a roughened surface.

24. A cable winding device according to claim 1, further comprising guide rollers arranged in fixed fashion on the housing at a circumference of the operating pulley, the cable being guided in a fixed path by the guide rollers.

25. A cable winding device according to claim 24, further comprising means securing the cable in the area of the entrance opening.

26. A cable winding device according to claim 25, further comprising between an entry side of the operating pulley and the storage space a frustoconical guide in two parts, the wider end facing the storage space.

27. A cable winding device according to claim 26, further comprising a two-part partition wall separating the storage space from a space occupied by the operating pulley.

28. A cable winding device according to claim 27, in which the bottom of the storage space is at an angle to the horizontal.

29. A cable winding device according to claim 1, comprising first and second winding rollers, and the clutch means comprising a friction clutch operatively connecting the first winding roller to the operating pulley, the spring engaging the two winding rollers so as to be increasingly tensioned as the cable is withdrawn from the device and the operating pulley being thereby rotated, thus simultaneously rotating the winding rollers due to the friction clutch interconnecting the operating pulley and the first winding roller, the frictional engagement between the clutch and the first operating pulley being such that the clutch slips relative to the first operating pulley when the spring is substantially fully tensioned by withdrawal of the cable from the device thereby maintaining the spring substantially fully tensioned and permitting further withdrawal of the cable while the spring remains in the substantially fully tensioned state.

30. A cable winding device according to claim 29, in which the spring is a scroll spring, an end of the spring being connected to the first winding roller adjacent to the operating pulley, and the other end of the spring being connected to the second winding roller supported on a pin integral with a side of the housing and being arranged to be pulled by the second winding roller.

* * * * *